April 19, 1949.                L. HORNBOSTEL                    2,467,830
                      FLUID PRESSURE OPERATED DEVICE
                            FOR USE WITH A CLUTCH
Filed April 26, 1945                                        3 Sheets-Sheet 1

Inventor
Lloyd Hornbostel
by The Firm of Charles W. Hills
Attys.

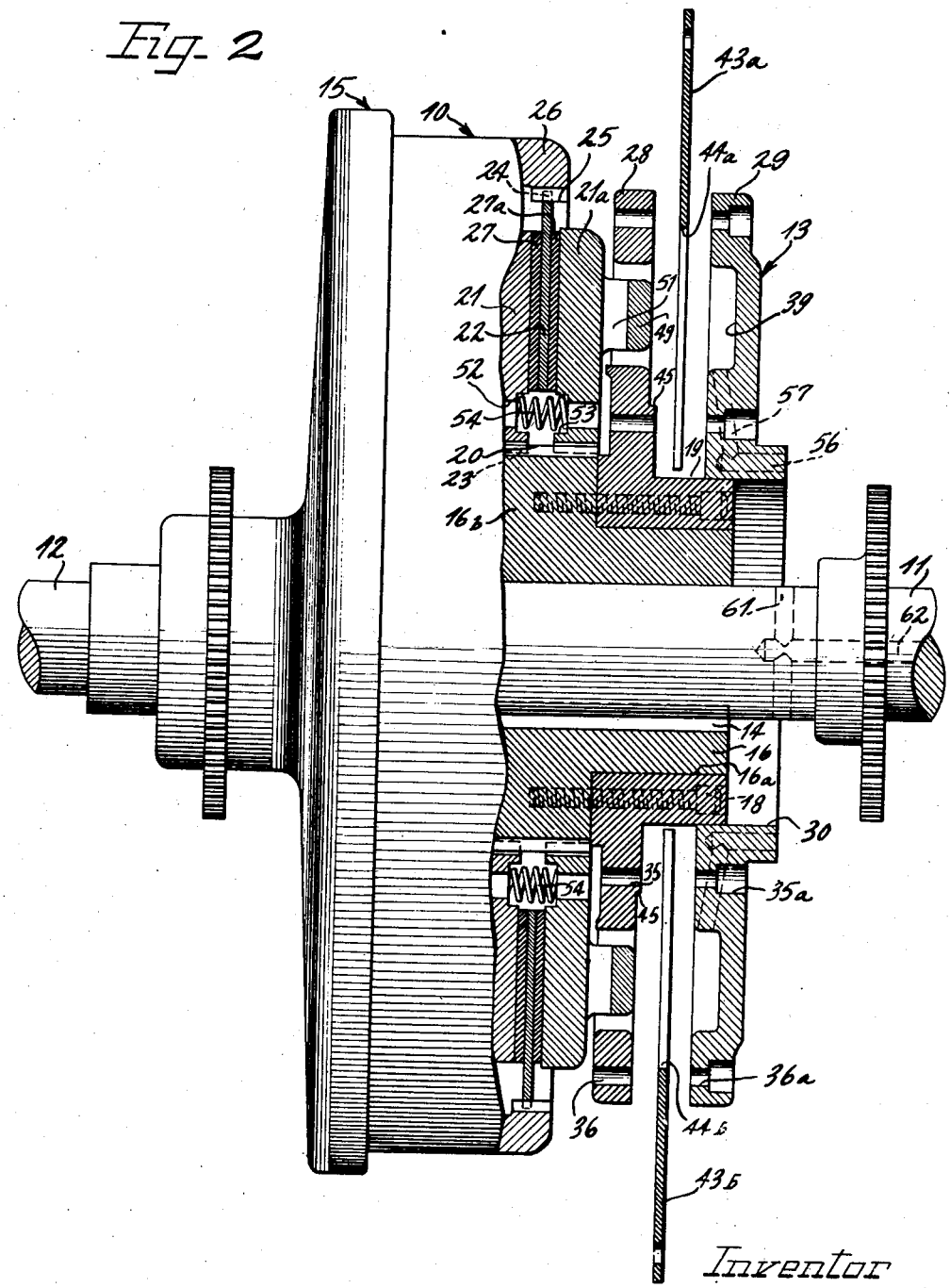

April 19, 1949.  L. HORNBOSTEL  2,467,830
FLUID PRESSURE OPERATED DEVICE
FOR USE WITH A CLUTCH
Filed April 26, 1945  3 Sheets-Sheet 3
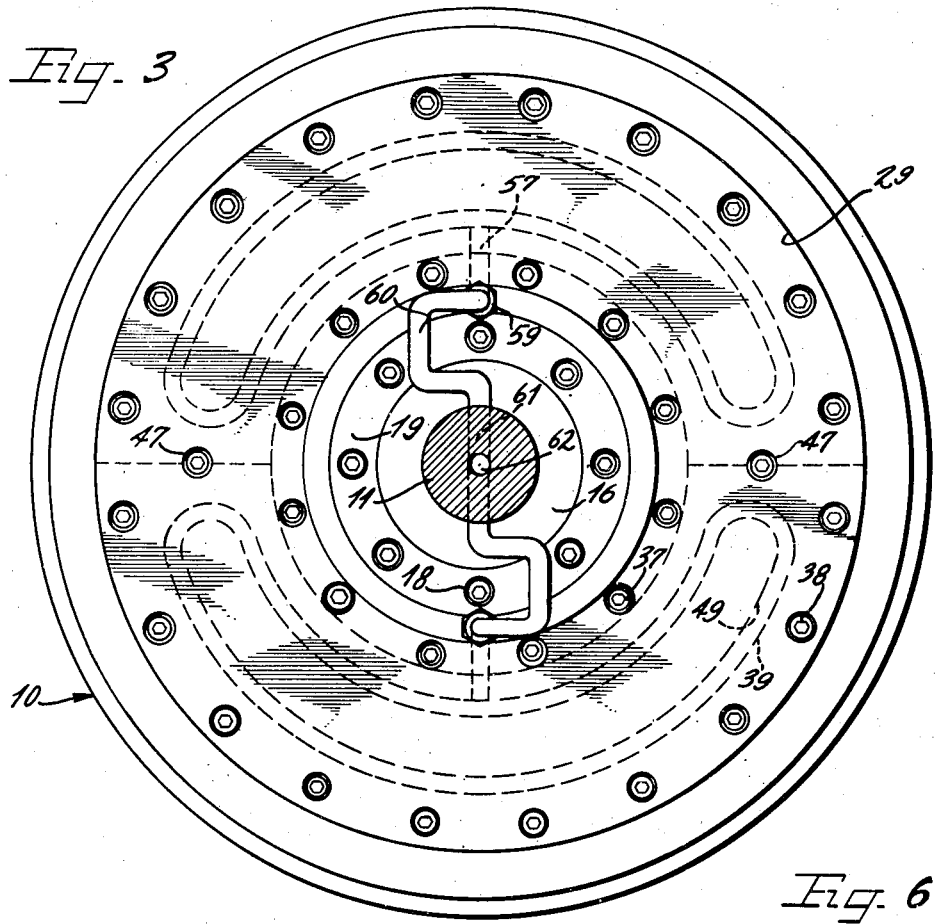
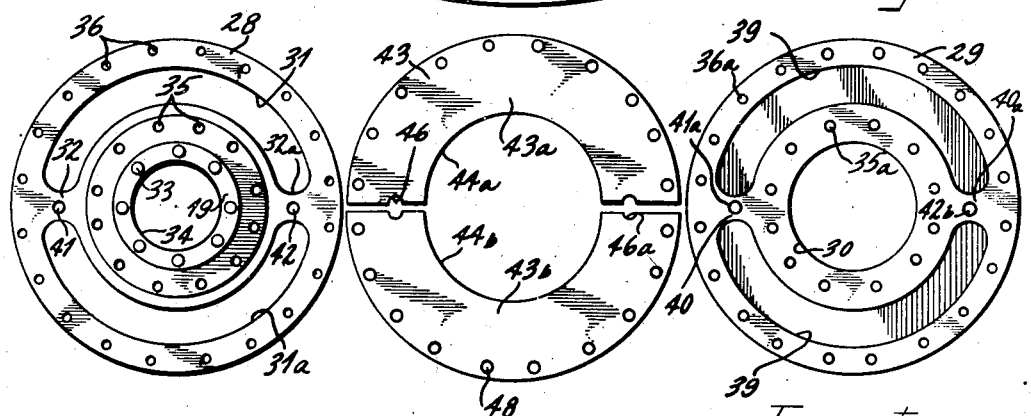
Inventor
Lloyd Hornbostel
The Firm of Charles W. Hills
by
Attys.

Patented Apr. 19, 1949

2,467,830

UNITED STATES PATENT OFFICE 2,467,830

FLUID PRESSURE OPERATED DEVICE FOR USE WITH CLUTCHES

Lloyd Hornbostel, Beloit, Wis., assignor to Beloit Iron Works, Beloit, Wis., a corporation of Wisconsin Application April 26, 1945, Serial No. 590,454

1 Claim. (Cl. 137—157)

This invention relates to a fluid pressure operated device for use with a clutch, and more particularly to a fluid pressure operated device for use with a friction type clutch adaptable for driving mechanisms.

The device of my present invention is preferably employed with a friction type clutch having a plurality of cooperating friction discs and clutch shoes, the device comprising generally a diaphragm carrying member, the diaphragm of which serves under fluid pressure to urge the shoes and friction discs into driving engagement. Compressed air is the preferred operating fluid.

One of the features of my present invention is to provide a diaphragm carrying member of novel and improved construction, whereby the diaphragm may be more readily replaced whenever that becomes necessary. In accordance with my present invention, a split diaphragm is used and the diaphragm carrying member comprises a pair of annular plates having mating peripheral surfaces cooperating to form registering arcuate openings and recesses to define with the diaphragm a fluid pressure chamber and also to provide mating surfaces that bridge the parting line of the diaphragm. By virtue of such construction, whenever it is necessary to replace a worn out or damaged diaphragm, all that is necessary is to remove the means that serve to clamp the two plates together, separate the plates and withdraw the diaphragm sections edgewise from between the plates, and then reinsert the new diaphragm sections and again clamp the plates together with the new diaphragm properly positioned therebetween. As contrasted with this relatively simple procedure, if the diaphragm were made in one piece, the entire driving portion of the clutch mechanism would have to be dismantled, removed from the driving shaft, taken apart to permit the removal of the old diaphragm and replacement of the new diaphragm, and then the whole mechanism reassembled on the driving shaft.

It is, therefore, an important object of this invention to provide an improved fluid pressure operated device for use with a friction clutch having a shaft, the device comprising a diaphragm carrying member mounted on the shaft and including a pair of annular plates adapted to be clamped together along mating peripheral surfaces, one of the plates having arcuate openings with a bridging portion therebetween and the other of the plates having spaced arcuate recesses with a mating portion therebetween, the recesses being in alignment and coextensive with the arcuate openings, and a flexible split annular diaphragm clamped between the mating surfaces with its parting line extending between the mated bridging portions, the diaphragm cooperating with the recesses to form pressure chambers for a fluid under pressure and being sufficiently flexible for removal edgewise upon the separation of the plates.

Other and further important objects of this invention will be apparent to those skilled in the art from the following detailed description of the annexed sheets of drawings, which, by way of example, illustrate a preferred embodiment of the invention.

On the drawings:

Figure 2 is an elevational view, partly broken away and in section, of the clutch driving mechanism illustrated in Figure 1, but illustrating the manner in which the diaphragm forming a part of the mechanism may be removed for replacement.

Figure 3 is a view taken substantially along the line III—III of Figure 1.

Figure 4 is an elevational view of one of the plates comprising the diaphragm carrying member, removed from the assembly.

Figure 5 is a view of the split diaphragm used in my improved mechanism.

Figure 6 is a view of the other plate making up the diaphragm carrying member, Figures 4, 5 and 6 serving to illustrate the component parts of the diaphragm carrying member and diaphragm as they might be laid out for assembly.

As shown on the drawings:

Figure 1:
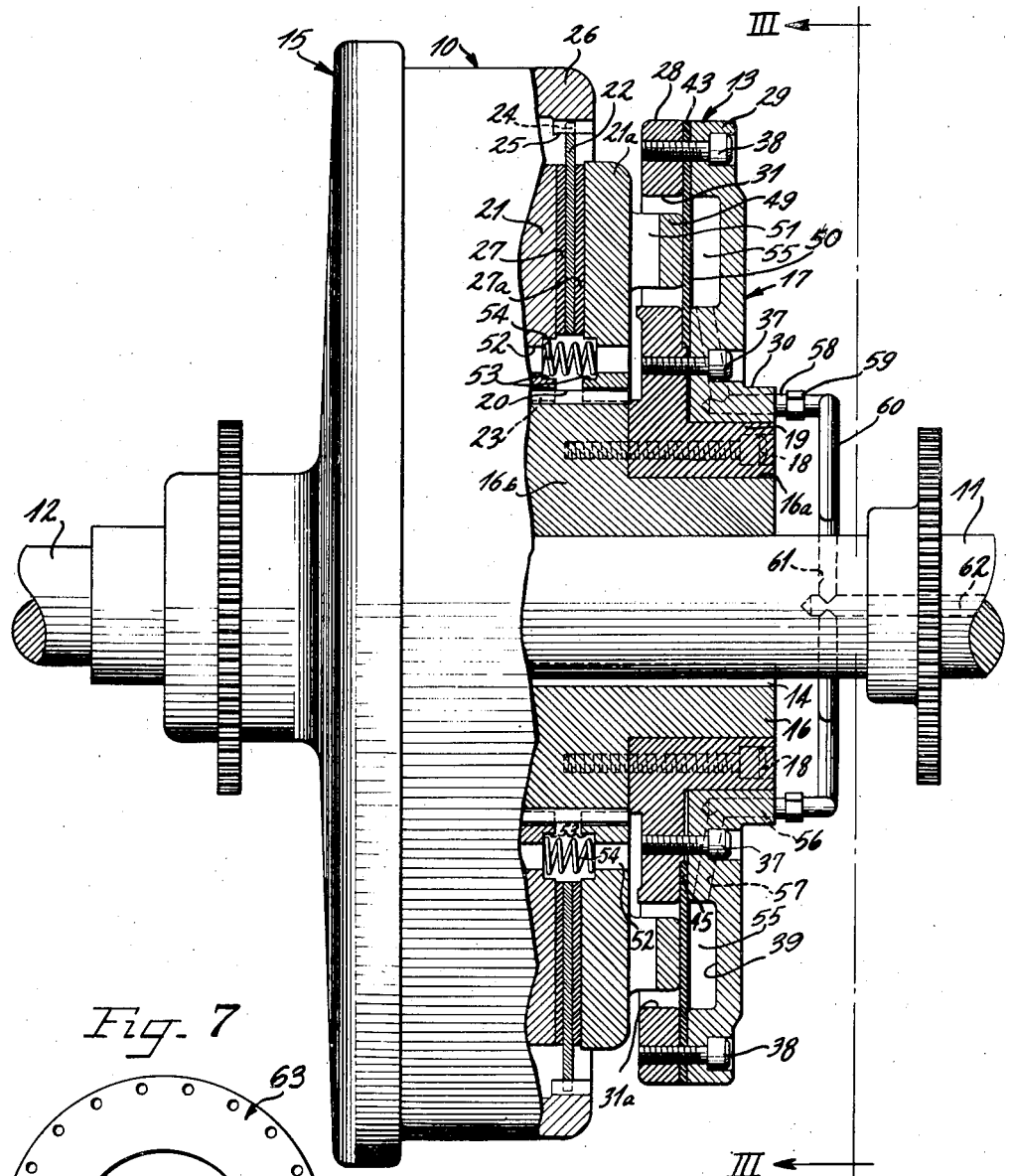
Figure 1 is an elevational view, partly broken away and in section of a clutch drive mechanism embodying the principles of my invention.

The reference numeral 10 indicates generally a fluid-operated, friction type clutch of my invention, arranged to form a driving connection between a driving shaft 11 and a driven shaft 12. The clutch mechanism 10 may be considered as comprising a driving part indicated by the reference numeral 13, which is splined to the driving shaft 11 by means of a spline or key 14, and a driven part, indicated by the reference numeral 15 which is splined (not shown) to the driven shaft 12.

The driving part of the clutch mechanism includes a hub 16, splined as described to the shaft 11 by means of the spline or key 14, said hub having a reduced diameter cylindrical end portion 16a upon which is assembled a diaphragm carrying member 17. Said diaphragm carrying member 17 is secured in place upon said reduced hub end 16a by means of bolts 18 that extend parallel to the axis of the shaft 11 through the peripheral inner flange 19 of said diaphragm carrying member 17 into the enlarged diameter portion 16b of said hub.

Said enlarged diameter hub portion 16b is externally splined, as at 20 to receive a plurality of alternately arranged clutch shoes 21 and friction discs 22. Only one set of disc 22 and clutch shoe 21 is illustrated, but it will be understood that other similar sets are employed, arranged as shown in my co-pending application Serial No. 480,053, filed March 22, 1943, of which the instant application is a continuation-in-part. The inner ends of said clutch shoes 21 are splined, as at 23 for engagement with the external splines 20, while the friction discs 22 are provided with teeth 24 for engaging with the internal spline 25 provided on an annular portion 26 of the driven part 15. Each of the discs 22 is provided with friction facings 27 and 27a for engagement by the adjacent faces of the clutch shoes 21 whenever the clutch mechanism is actuated to complete the driving connection between the shafts 11 and 12.

The diaphragm carrying member 17 comprises two annular plates, an inner plate 28 that is provided with the integral inner peripheral flange 19, and an outer plate 29 having an inner peripheral flange 30 that is adapted to fit over the flange 19 when the two plates are assembled. The inner plate 28, as best shown in Figures 1, 2 and 4, is provided with a pair of arcuate shaped apertures 31, 31a, that are almost semi-circular in extent and that are separated by narrow bridging portions 32, 32a, both of which lie along the same diameter. Said plate 28 is provided with bolt-receiving apertures 33 that are spaced circumferentially about the opening 34 defined by the peripheral flange 19 and that serve to receive the bolts 18. Other sets of circumferentially arranged bolt-receiving apertures 35 and 36 are provided inside of and outside of, respectively, the arcuate shaped openings 31 and serve for receiving the bolts 37 and 38 (Figs. 1 and 3) used for clamping the plates 28 and 29 together.

The plate 29, as best illustrated in Figures 1, 2 and 6, is similarly provided with arcuate shaped recesses 39, which correspond in dimension with the arcuate shaped openings 31 of the plate 28. The arcuate shaped recesses 39 are likewise spaced apart by narrow bridging portions 40 and 40a that provide surfaces adapted to mate with the surfaces of the bridging portions 32 and 32a of the plate 28. Bolt-receiving apertures 41 and 41a, and 42 and 42b are provided in said bridging portions 32, 40 and 32a, 40a, for registration when the plates 28 and 29 are assembled. The plate 29 is likewise provided with circumferentially arranged sets of apertures 35a and 36a for registry with the sets of apertures 35 and 36 in the plate 28, these respective sets of apertures receiving the bolts 37 and 38 that serve to clamp the plates 28 and 29 together.

A split diaphragm, indicated generally by the reference numeral 43, is adapted to be inserted between the plates 28 and 29 before these plates are clamped together by the bolts 37 and 38. Said diaphragm 43, which is preferably formed of flexible material such as a rayon fabric reenforced neoprene sheet material, is formed in annular halves 43a and 43b, which together define a complete circular annulus. The inner edges 44a and 44b define a circle of such diameter as to lie outside of the inner circle of bolts 37 but of sufficiently small diameter to bring the inner marginal portions of said diaphragm halves 43a and 43b into clamping relationship between the opposed surfaces of the plates 28 and 29. To insure proper positioning of the diaphragm halves 43a and 43b, the plate 28 is provided with an annular recess 45 (Figs. 1 and 2) for receiving said diaphragm halves but of less depth than the thickness of said halves. The end edges of said halves 43a and 43b are provided with semi-circular notches 46 and 46a for registry with the bolt-receiving apertures 41, 41a and 42, 42b, so that when the plates 28 and 29 are assembled with the diaphragm 43 in position therebetween, bolts 47 pass through said registering openings and notches. The diaphragm halves 43a and 43b are also provided with a circular set of apertures 48 for registration with the holes 36 and 36a, and the set of bolts 38 pass through these registering holes and apertures in the assembling of the diaphragm carrying member 13.

Figure 7:
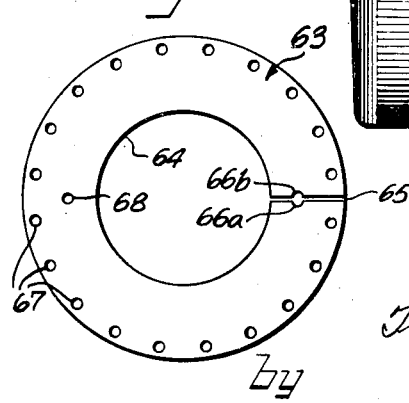
Figure 7 is a view of a modified form of a split diaphragm suitable for use with my invention.

Alternatively, if desired, the diaphragm 43 can be in the form of a one-piece split annulus, as shown in Fig. 7. In Fig. 7, an alternative type of split diaphragm 43 is provided in the form of a one-piece split annulus 63, defining at its inner periphery 64 a circle of such diameter as to lie outside the inner circle of bolts 37 but of sufficiently small diameter to bring the inner marginal portions of the annulus into clamping relationship between the opposed surfaces of the plates 28 and 29. The annulus 43 is radially split as at 65 and the split edges are provided with semi-circular notches 66a and 66b for register with the bolt-receiving apertures 42 and 42a, so that when the plates 28 and 29 are assembled with the annulus 63 therebetween, bolts 47 pass through said registering openings and notches. The annulus 63 is also provided with a circular set of apertures 67 for registry with the holes 36 and 36a, and the set of bolts 38 pass through these registering holes and apertures in the assembling of the diaphragm carrying member 13. The annulus is also apertured at 68 to receive bolts 67 passing through the registering bolt-receiving apertures 41 and 41a.

The clutch shoe nearest to the diaphragm carrying member 13, indicated by the reference numeral 21a (Figs. 1 and 2) is provided with an annular portion 49 that extends into contact with the free annular portion 50 of the diaphragm 43. Said annular extension 49 is provided with radially extending passages 51 that serve to permit the flow therethrough of air to dissipate heat from the clutch shoe 21a. The clutch shoes 21 and 21a are also provided with through passages 52, parallel to the axis of the shafts 11 and 12, to permit the flow of air through the assembled clutch shoes and friction discs, likewise for the purpose of dissipating the heat generated by the frictional engagement between said clutch shoes and discs. Said passages 52 are enlarged by providing circular recesses 53 in the opposed surfaces of the clutch shoes 21 and 21a, and in the enlarged portion so formed are disposed helical springs 54 for urging the clutch shoes 21 and 21a apart.

With the diaphragm carrying member 13 assembled, the free annular portions 50 of the diaphragm close the recesses 39 to form a pair of annular fluid pressure chambers 55. Fluid under pressure may be introduced into said chambers 55 through a pair of passages formed in the plate 29, each of the passages comprising a bore 56 (Figs. 1 and 2) formed in the inner peripheral flange 30 and extending parallel to the axes of the shafts 11 and 12, and a connecting passage 57 bored at an angle through an inner wall defining a recess 39. The outer ends of the passages 56 receive nipples 58, which are connected by means of coupling unions 59 to offset pipe lengths 60. The other ends of said pipe lengths 60 are fitted into the respective ends of a bore 61 extending transversely through the shaft 11 for connection with an axially extending passage 62. The pasage 62 is connected as its outer end (not shown) with a source of fluid, such as air, under pressure.

Accordingly, when it is desired to effect a driving connection through the clutch 10 between the driving shaft 11 and the driven shaft 12, fluid under pressure is introduced through the passage 62, transverse passages 61, pipe lengths 60, nipples 58 and communicating passages 56 and 57, into the annular fluid chambers 55. A sufficient amount of pressure within the chambers 55 is built up to cause the free diaphragm portions 50 to be distended in the direction of the clutch shoe engaging portion 49 and thus to urge the clutch shoe 21a, against the opposing forces of the springs 54, into frictional engagement with the disc facing 27a. Continued flexing of the diaphragm portions 50 under fluid pressure moves the clutch elements toward a fixed abutment shoe forming a part of the clutch assembly and thus affects the frictional engagement of all of the clutch shoes 21 with the adjacent friction facings 27, or 27a, of the friction discs 22. The provision of the internal and external splines 24, 25 and 20, 23 permits the axial shifting of the clutch shoes 21, 21a, and the friction discs 22 into the frictional engagement just described. By properly controlling the amount of pressure of the fluid introduced into the annular chambers 55 and the rate of introduction of such fluid, the frictional engagement of the clutch shoes 21, 21a and the friction facings 27, 27a of the discs 22 can be so regulated as to obtain a smooth starting up of the driven shaft 12 from a position of rest and a gradual acceleration of the rate of rotation of said driven shaft 12.

As will be best appreciated from an inspection of Figure 2, the provision of the split diaphragm 43 facilitates the assembly and dismantling of the diaphragm carrying member 17 when it becomes necessary to replace a worn or damaged diaphragm with a new diaphragm. As illustrated in that figure, upon removal of the bolts 37 and 38 and the pair of bolts 47, but without disturbing the bolts 18, the outer plate 29 is merely moved outwardly along the peripheral hub flange 19 to separate the two plates to an extent such as that indicated by Figure 2. The diaphragm halves 43a and 43b may then be removed edgewise from between the plates 28 and 29, as illustrated in Figure 2, and a new diaphragm inserted in place by a reversal of the same movement. The whole operation is thus accomplished merely by the removal of the bolts 37, 38 and 47, and the uncoupling of the unions 59 to permit the pipe lengths 60 to be swung out of the way and the plate 29 moved outwardly.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

In a fluid operated friction clutch, a shaft, a diaphragm carrying member mounted on said shaft including a pair of annular plates having mating coextensive with their peripheral portions, one of said plates having arcuate openings therethrough lying on opposite sides of said shaft with a bridging portion therebetween, the other of said plates having spaced arcuate recesses with a mating bridging portion therebetween, said recesses being in alignment and coextensive with said arcuate openings, a flexible split annular diaphragm clamped between said mating surfaces with its parting line extending between said mated bridging portions, said diaphragm being disposed across said recesses to form pressure chambers, means for clamping said plates together with said parting line clamped between said mating bridging portions, said flexible diaphragm being capable of sufficient distortion adjacent the split portion to allow the removal of the diaphragm edgewise when said clamping means are removed and said plates are separated, and means for directing a fluid under pressure to said pressure chamber.

LLOYD HORNBOSTEL.

REFERENCES CITED

The following references are of record in the file of this patent:

UNITED STATES PATENTS

| Number | Name | Date |
|---|---|---|
| 604,474 | Jessup | May 24, 1898 |
| 1,623,399 | Eisenhauer | Apr. 5, 1927 |
| 2,180,320 | Hansen | Nov. 14, 1939 |
| 2,352,629 | Griswold | July 4, 1944 |
| 2,370,360 | McLean et al. | Feb. 27, 1945 |
| 2,373,572 | Lambert | Apr. 10, 1945 |
| 2,375,855 | Lambert | May 15, 1945 |
| 2,395,239 | White | Feb. 19, 1946 |
| 2,437,737 | Halby | Mar. 16, 1948 |